(12) United States Patent
Kummer et al.

(10) Patent No.: US 10,334,297 B2
(45) Date of Patent: *Jun. 25, 2019

(54) GEOGRAPHICALLY INDEPENDENT DETERMINATION OF SEGMENT BOUNDARIES WITHIN A VIDEO STREAM

(71) Applicant: DISH TECHNOLOGIES LLC, Englewood, CO (US)

(72) Inventors: David A. Kummer, Highlands Ranch, CO (US); Steven M. Casagrande, Castle Rock, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,135

(22) Filed: May 3, 2017

(65) Prior Publication Data
US 2017/0238034 A1    Aug. 17, 2017

Related U.S. Application Data

(60) Continuation of application No. 15/010,163, filed on Jan. 29, 2016, now Pat. No. 9,648,367, which is a
(Continued)

(51) Int. Cl.
*H04N 21/258* (2011.01)
*H04N 21/234* (2011.01)
(Continued)

(52) U.S. Cl.
CPC ....... *H04N 21/25841* (2013.01); *G11B 27/28* (2013.01); *H04N 5/76* (2013.01); *H04N 21/23418* (2013.01); *H04N 21/23424* (2013.01); *H04N 21/242* (2013.01); *H04N 21/25883* (2013.01); *H04N 21/45457* (2013.01); *H04N 21/6581* (2013.01); *H04N 21/812* (2013.01); *H04N 21/8455* (2013.01); *H04N 21/8456* (2013.01)

(58) Field of Classification Search
CPC ................... H04N 21/23418; H04N 21/23424
USPC ............................................. 725/34, 35, 88
See application file for complete search history.

(56) References Cited

U.S. PATENT DOCUMENTS 7,272,295 B1    9/2007    Christopher
8,165,450 B2    4/2012    Casagrande
(Continued)

OTHER PUBLICATIONS

European Patent Office International Searching Authority, International Search Report and Written Opinion, dated Jul. 3, 2014 for International Application No. PCT/US2014/026532.

*Primary Examiner* — Pankaj Kumar
*Assistant Examiner* — Franklin Andramuno
(74) *Attorney, Agent, or Firm* — Lorenz & Kopf LLP

(57) ABSTRACT

A method for creating an announcement stream for a geographic region is provided. The method receives, at a designated computer system, characterizing metadata for a first audio/video stream; analyzes a second audio/video stream to obtain characterizing metadata for the second video stream; compares, with the computer system, the characterizing metadata for the first video stream to the characterizing metadata for the second video stream to generate offset data; and calculates timing information corresponding to segment boundaries for the second video stream using the offset data.

20 Claims, 13 Drawing Sheets

Related U.S. Application Data division of application No. 14/032,543, filed on Sep. 20, 2013, now Pat. No. 9,277,251.

(51) Int. Cl.
*H04N 21/658* (2011.01)
*H04N 21/242* (2011.01)
*H04N 5/76* (2006.01)
*H04N 21/81* (2011.01)
*H04N 21/4545* (2011.01)
*H04N 21/845* (2011.01)
*G11B 27/28* (2006.01)

(56) References Cited

U.S. PATENT DOCUMENTS

| | | |
|---|---|---|
| 8,326,127 B2 | 12/2012 | Casagrande |
| 8,407,735 B2 | 3/2013 | Casagrande et al. |
| 2004/0226035 A1 | 11/2004 | Hauser, Jr. |
| 2007/0183462 A1* | 8/2007 | Daugherty ............ H04J 3/0629 370/509 |
| 2007/0294295 A1* | 12/2007 | Finkelstein ....... G06F 17/30017 |
| 2009/0028520 A1 | 1/2009 | Jain et al. |
| 2013/0097190 A1* | 4/2013 | Shah ................ G06F 17/30029 707/754 |

* cited by examiner

GEOGRAPHICALLY INDEPENDENT DETERMINATION OF SEGMENT BOUNDARIES WITHIN A VIDEO STREAM

CROSS-REFERENCE TO RELATED APPLICATION(S)

This application is a continuation of U.S. divisional patent application Ser. No. 15/010,163, filed Jan. 29, 2016, which claims the benefit of U.S. patent application Ser. No. 14/032,543, filed Sep. 20, 2013, now U.S. Pat. No. 9,277,251, which claims the benefit of U.S. provisional patent application Ser. No. 61/788,294, filed Mar. 15, 2013.

TECHNICAL FIELD

Embodiments of the subject matter described herein relate generally to the processing of video content. More particularly, embodiments of the subject matter relate to the determination of segment boundaries within a video stream in a specific Designated Market Area (DMA).

BACKGROUND

Digital Video Recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

A number of techniques for automatically skipping over commercial breaks have been investigated and developed. One known technique relies on markers or tags embedded within the video stream data itself. Other approaches rely on closed captioning data to identify segment boundaries of interest. Such conventional techniques, however, may not be suitable for deployment across multiple time zones and across multiple DMAs, because closed captioning timing may vary from one DMA to another, because the commercials may differ from one DMA to another, because the timing of commercial breaks may differ from one time zone to another.

BRIEF SUMMARY OF EMBODIMENTS

Some embodiments provide a method for creating an announcement stream for a geographic region. The method receives, at a designated computer system, characterizing metadata for a first audio/video stream; analyzes a second audio/video stream to obtain characterizing metadata for the second video stream; compares, with the computer system, the characterizing metadata for the first video stream to the characterizing metadata for the second video stream to generate offset data; and calculates timing information corresponding to segment boundaries for the second video stream using the offset data.

Some embodiments provide a system for processing video stream data. The system includes a communication module, configured to receive characterizing metadata for a first video stream; and a processor architecture coupled to the communication module. The processor architecture includes a video stream analysis module, configured to analyze a second video stream to obtain characterizing metadata for the second video stream; and a comparison module, configured to compare the characterizing metadata for the first video stream to the characterizing metadata for the second video stream to generate offset data; wherein the video stream analysis module is further configured to calculate timing information corresponding to segment boundaries for the second video stream using the offset data.

Some embodiments provide a system for processing video stream data. The system includes a marking station, configured to parse a reference video stream and to store data for the reference video stream, wherein the reference video stream comprises a plurality of video frames; and a comparison station, configured to receive reference video stream data, parse and store data for a video stream of interest, compare the reference video stream data to data for the video stream of interest, determine a plurality of segment boundaries for the video stream of interest based upon the comparison, and transmit announcement data comprising at least the determined plurality of segment boundaries to a plurality of video services receivers.

Some embodiments provide a method for processing video stream data. The method receives, at a computer system having a processor, a first waveform depicting data comprising average luminance values for each of a plurality of video frames contained within a first video stream; calculates, at the computer system, average luminance values for each of a plurality of video frames contained within a second video stream; generates a second waveform, corresponding to the second video stream, using the calculated average luminance values; obtains offset data by comparing the first waveform to the second waveform; and generates timing information regarding the beginning and ending of at least one portion of the video stream using the offset data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used by a video processing system, within a video broadcast region, to determine timing information generally associated with segment boundaries or other significant events in a video stream. In some embodiments, characterizing metadata of a reference video stream is received at a designated computer system within a video broadcast region, and is then compared to characterizing metadata of a video stream of interest. A video segment match is located based on the comparison, and new timing values, corresponding to video segment boundaries, are determined for the video stream of interest. The approach described herein compares average luminance values for individual video frames to determine where commercial breaks (and/or any designated segments of the video stream) are located within a stream of video broadcast content.

Figure 1:
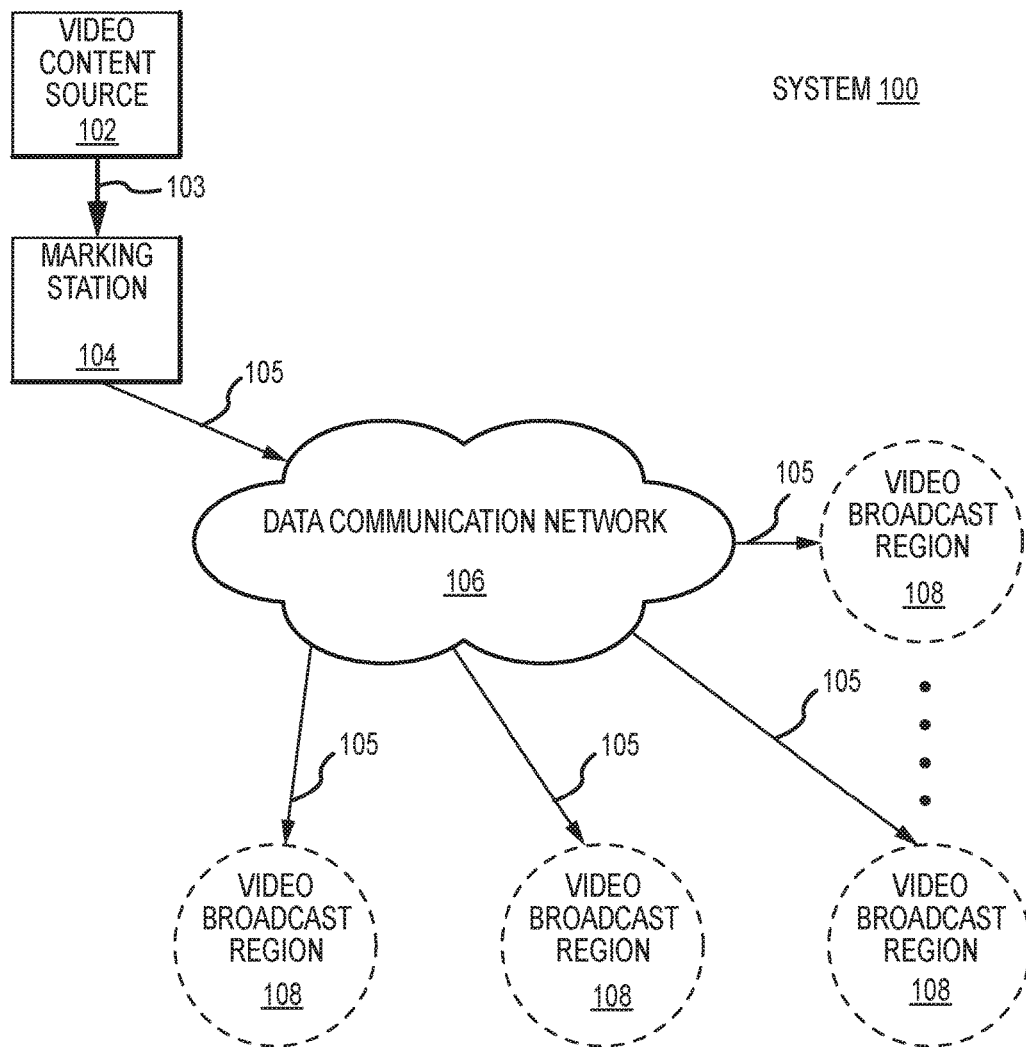
FIG. 1 is a schematic representation of an embodiment of a video services system.

Referring now to the drawings, FIG. 1 is a schematic representation of an embodiment of a video services system 100 that is suitably configured to support the techniques for identifying video segment boundaries described in more detail herein. The video services system 100 may utilize any data communication methodology, including, without limitation: satellite-based data delivery, cable-based data delivery, cellular-based data delivery, web-based delivery, or a combination thereof. In this regard, the system 100 may include or utilize a data communication network 106, as depicted in FIG. 1. The specific details of such delivery systems and related data communication protocols will not be described here.

In practice, the data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to video/media communication systems, video/media broadcasting systems, data transmission, signaling, network control, and other functional aspects of the systems (and the individual operating components of the systems) may not be described in detail herein.

The video services system 100 (which has been simplified for purposes of illustration) generally includes, without limitation: at least one video content source 102, at least one marking station 104, a data communication network 106, and a plurality of video broadcast regions 108. The video broadcast regions 108 communicate with the marking station 104 and/or the video content source 102 via a data communication network 106. Although FIG. 1 only depicts four video broadcast regions 108, it should be appreciated that the video services system 100 may support any number of video broadcast regions 108, and that a typical video broadcast region 108 may comprise a Designated Market Area (DMA). A DMA is a geographic region in which the public may receive the same television broadcast offerings, and its boundaries are typically defined by the Federal Communications Commission (FCC). Currently, there are 212 existing DMAs in the United States, but the number in existence may vary. Within the scope of this application it is necessary that there be at least two video broadcast regions 108 in existence.

Variances may be introduced into the video broadcast content when the same program content is aired in different video broadcast regions 108. For example, each video broadcast region 108 may broadcast advertising content that is relevant to a local audience, which can create a commercial break that may be longer or shorter in duration than that of a reference video stream 103. Additional variances may include increased or decreased numbers of segment boundaries within video broadcast content, differing numbers and/or duration of "black-frame" periods throughout the video broadcast content, "breaking" news cut-ins within the video broadcast content, preempted portions of video broadcast content (e.g., by a local sports team, etc.), delayed start times, varying screen overlays in different markets, and the like.

For simplicity and ease of illustration, FIG. 1 and this description assume that only one marking station 104 is deployed in the system 100, and that only one video content source 102 communicates with the marking station 104. It should be understood that an embodiment of the system 100 may include or support any number of marking stations 104 and any number of video content sources 102. The video content source 102 is implemented as a physically distinct and remote device or system relative to the marking station 104. Moreover, a physically distinct video content source 102 may communicate with the marking station 104 directly or via the data communication network 106 if so desired. In certain embodiments, the video content source 102 communicates with the marking station 104 using an off-air video broadcast, cable television network, satellite television network, or the like. The video content source 102 provides media content (such as audio/video programming, advertising content, music programming, and other video or audio-visual content) to each video broadcast region 108 and the marking station 104, which in turn provides output 105 to the video broadcast regions 108 as needed. The marking station 104 operates in parallel with the normal video delivery system.

The marking station 104 may be implemented as one or more computer-based devices, components, or systems. The marking station 104 receives video content 103 from the video content source 102 for processing. The video content 103 that is processed by the marking station 104 may be referred to herein as a "reference" video stream, "reference" video content, or the like. The marking station 104 processes the video content 103 to identify and/or extract information regarding the stream of video content 103. For example, the marking station 104 analyzes the stream of video content 103 to obtain characterizing metadata regarding the stream of video content 103. In some embodiments, the characterizing metadata comprises average luminance values for each frame within the stream of video content 103. In some embodiments, the characterizing metadata comprises timing information associated with each individual frame within the stream of video content 103, wherein the timing information may be associated with Presentation Time Stamp (PTS) values, Program Clock Reference (PCR) values, or the like. In yet other embodiments, the characterizing metadata may include, without limitation, audio data, Closed Captioning data, and/or color space information.

The marking station 104 "marks" segment boundaries within a stream of video content 103. The action of "marking" the segment boundaries may comprise creating a notation on an individual video frame within the stream of video content 103, and/or recording additional characterizing metadata regarding the stream of video content 103 comprising timing information used to delineate commercial segments, individual commercials, sporting events (such as touchdowns, goals, homeruns, lead changes, etc.), product placement opportunities, and the like.

The marking station 104 may be manually operated, using human input, or may be operated using specialized computer hardware, software, or other technology to determine and/or record segment boundaries and timing information associated with those segment boundaries. The marking station 104 produces output 105, comprising the characterizing metadata for the stream of video content 103, and communicates this output 105 to one or more video broadcast regions 108 for localized use.

The marking station 104 may be located in a specific video broadcast region, in which video content is broadcast according to the Designated Market Area (DMA). The DMA within this specific video broadcast region differs from the DMAs of at least some of the remaining video broadcast regions. In an exemplary embodiment, video broadcast content within a reference video stream 103 and at least one other video broadcast region includes the same programming content (i.e., the same television show, movie, and/or presentation is aired in more than one video broadcast region). Varying segments within video broadcast content, due to differing local versus national advertising content, differing lengths of "black-frame" periods within video broadcast content, a differing number and/or duration of breaks in the video broadcast content, etc., create a situation in which the video broadcast content within a reference video stream 103 may not be exactly identical to the video broadcast content in other video streams that are broadcast in other video broadcast regions 108. In some embodiments, the marking station 104 should be located in a video broadcast region 108 that resides in the "earliest" possible time zone, enabling the marking station 104 to complete the process of marking the reference video stream 103 before the video broadcast content may be broadcast, recorded, and played back in any other video broadcast region 108. In some embodiments within the continental United States, the marking station resides in the Eastern Standard Time (EST) zone, in which video broadcast content is aired before the Mountain and Pacific Standard Time zones.

Figure 2:
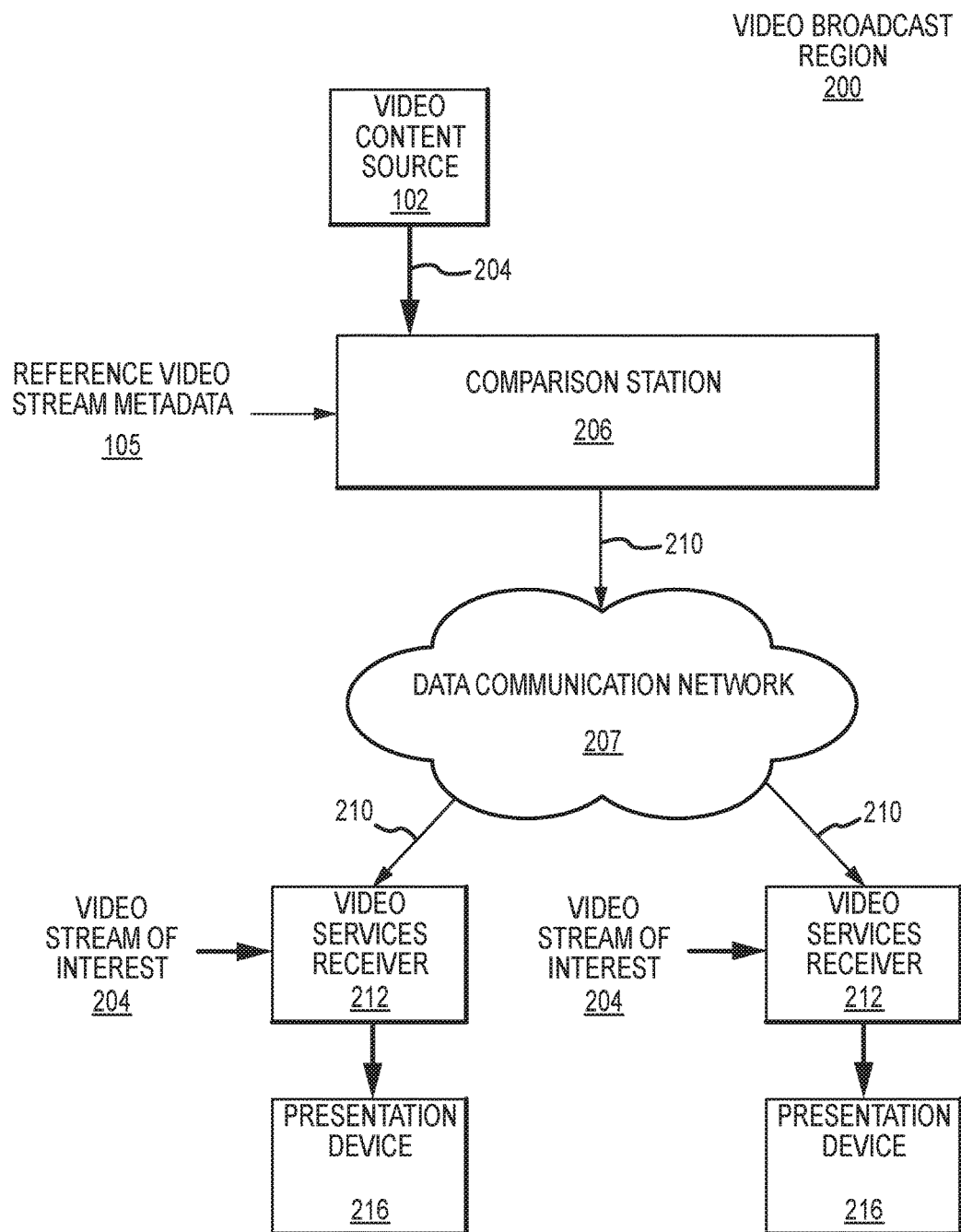
FIG. 2 is a schematic representation of an embodiment of a video broadcast region.

FIG. 2 is a schematic representation of an embodiment of a video broadcast region 200. Each video broadcast region 108 depicted in FIG. 1 may be configured as described here for the video broadcast region 200. The video broadcast region 200 generally includes, without limitation, a video content source 102, a comparison station 206, video services receivers 212, and presentation devices 216.

The video content source 102 provides a video stream of interest 204 to the comparison station 206. The video content source 102 may be implemented as a single a communications media source, for example. The video content source 102 was described in detail above. This description also applies to the video content source 102 in FIG. 2, and will not be repeated here.

The video stream of interest 204 represents the actual video broadcast content as generated and provided within the video broadcast region 200. Due to the existence of a plurality of video broadcast regions 200, there will be a plurality of video streams of interest 204 for a given piece of programming content such as a network television show, and each video stream of interest 204 may be unique to its video broadcast region 200.

In some embodiments, the video stream of interest 204 includes a sequence of video frames with associated timing information, formatted in accordance with the Motion Picture Experts Group (MPEG) standard. Within a video stream of interest 204, each frame will be rendered in a way that allows the system to calculate average luminance values per frame using associated pixels, light intensity, etc. In some embodiments, timing information for each video frame may comprise a Presentation Time Stamp (PTS) value. A PTS is a reference timing value that is generally included in packet media streams (digital audio, video or data), according to the MPEG standard. PTS values are used to control the presentation time alignment of such media, through synchronization of separate components within a video content stream (e.g., video, audio, subtitles, etc.). In other embodiments, timing information for each video frame may comprise a Program Clock Reference (PCR) value. As used in association with compressed digital video, a PCR value consists of a time stamp that indicates an associated System Time Clock (STC) value at the time a packet leaves an encoder. Alternatively, an accurate Time of Day clock may be used.

The video stream of interest 204 contains at least a portion of video broadcast content in common with a reference video stream 103, but may differ from the reference video stream 103 as shown in FIG. 1, in one or more ways. In some embodiments, the video stream of interest 204 includes a time-shifted version of the video broadcast content that is contained within the reference video stream 103. In some embodiments, the video stream of interest 204 includes one or more segment boundaries that differ from the segment boundaries within the reference video stream 103 in their timing information. In some embodiments, the video stream of interest 204 includes longer and/or shorter durations of time between segment boundaries. In some embodiments, the video stream of interest 204 includes fewer or additional segment boundaries than the video broadcast content within the reference video stream 103.

The comparison station 206 may be implemented as one or more computer-based devices, components, or systems. The comparison station 206 receives reference video stream metadata 105, in addition to the video stream of interest 204 communicated by the video content source 102. The reference video stream metadata 105 corresponds to the output 105 of the marking station of FIG. 1. The comparison station 206 processes the video stream of interest 204 and the reference video stream metadata 105 (in the manner described in more detail below) to generate an output corresponding to the video stream of interest 204.

The output of the comparison station 206 includes timing information 210 for the video stream of interest 204. The timing information 210 for the video stream of interest 204 may include timing data for each individual video frame within the video stream of interest 204 and/or timing data corresponding to the segment boundaries within the video stream of interest 204. In exemplary embodiments, the timing information 210 for the video stream of interest 204 includes timing data corresponding to segment boundaries within the video stream of interest 204. Components of the characterizing metadata of the video stream of interest 204 are similar to the components of the characterizing metadata of the reference video stream. Characterizing metadata for the video stream of interest 204 may include PTS or PCR values representing individual video frames and/or segment boundaries within the video stream of interest 204.

The comparison station 206 provides the timing information 210 to one or more video services receivers 212. Although FIG. 2 depicts only two video services receivers 212, it should be appreciated that the video broadcast region 200 may support any number of video services receivers, and that a typical video broadcast region 200 may include video services receivers 212 that are geographically distributed throughout a large area, such as a city, a county, a region, or the like.

The video services receivers 212 communicate with the comparison station 206 via a data communication network 207. It should be appreciated that the video content source 102 may be realized as a physically distinct and remote device relative to the comparison station 206. Moreover, a physically distinct video content source 102 may communicate with the comparison station 206 via the data communication network 207 if so desired. The video content source 102 provides media content (discussed above with regard to FIG. 1) to the comparison station 206, which in turn provides timing information 210 to the video services receivers 212 as needed. For the sake of brevity, conventional techniques related to video/media communication systems, video/media broadcasting systems, data transmission, signaling, network control, and other functional aspects of the systems (and the individual operating components of the systems) may not be described in detail herein.

In addition to the timing information 210, the video services receivers 212 also receive the video stream of interest 204, which represents the actual video broadcast content as generated and provided within the video broadcast region 200, as described previously. The video stream of interest 204 is communicated from the video content source 102 to a plurality of video services receivers 212 via the data communication network 207, fiber, internet, wireless, or cellular networks, and/or off-air, satellite, or cable broadcasts. Video services receivers 212 are configured to record received video broadcast content, and may comprise Digital Video Recorder (DVR) technology. Thus, the video services receivers 212 can record one or more video streams of interest 204, receive timing information 210 from the comparison station 206, and thereafter apply the timing information 210 to the recorded video stream of interest 204 to accurately identify segment boundaries.

Each video services receiver 212 produces output that is communicated to a presentation device 216. Each video services receiver 212 may include or cooperate with a suitably configured presentation device 216. The presentation device 216 may be, without limitation: a television set; a monitor; a computer display; a portable electronic device; or any suitable customer appliance with compatible display capabilities. In various embodiments, each video services receiver 212 is a conventional set-top box commonly used with satellite or cable television distribution systems. In other embodiments, however, the functionality of a video services receiver 212 may be commonly housed within a presentation device. In still other embodiments, a video services receiver 212 is a portable device that may be transportable with or without the presentation device 216. A video services receiver 212 may also be suitably configured to support broadcast television reception, video game playing, personal video recording and/or other features as desired.

During typical operation, the video services receivers 212 receive the video stream of interest 204 (such as primary program content interspersed with segments of secondary content, commercials, and/or targeted advertising), signaling information, and/or other data via the data communication network 207, fiber, internet, wireless, or cellular networks, and/or off-air, satellite, or cable broadcasts. The video services receivers 212 then demodulate, descramble, decompress, and/or otherwise process the received digital data, and then convert the received data to suitably formatted video signals that can be rendered for viewing, and/or stored for future viewing, by the customer on the presentation devices.

Figure 3:
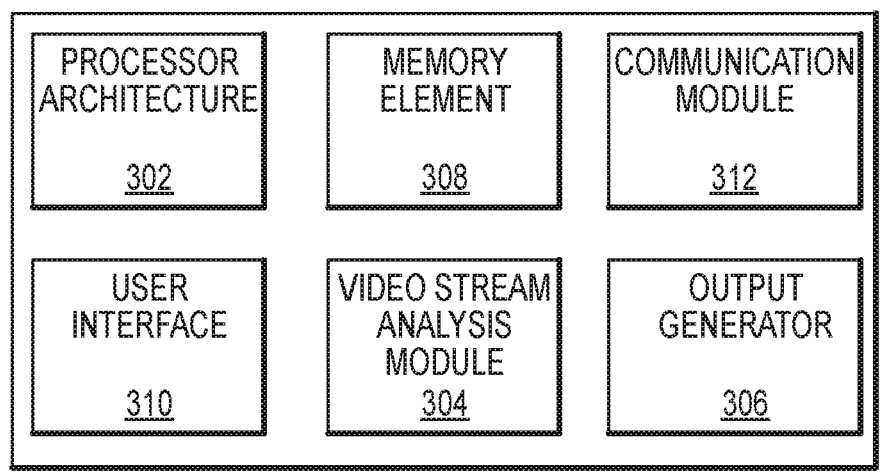
FIG. 3 is a schematic block diagram representation of an embodiment of a marking station suitable for use in the system shown in FIG. 1.

FIG. 3 is a schematic block diagram representation of an embodiment of a marking station 300, which is suitable for use in the system 100 shown in FIG. 1. The marking station 300 can be realized as a computer-based component or system. The illustrated embodiment of the marking station 300 generally includes, without limitation: a processor architecture 302, a video stream analysis module 304, an output generator 306, at least one memory element 308, a user interface (UI) 310, and a communication module 312. These components and elements may be coupled together as needed for purposes of interaction and communication using, for example, an appropriate interconnect arrangement or architecture.

It should be appreciated that the marking station 300 represents a "full featured" embodiment that supports various features described herein. In practice, an implementation of the marking station 300 need not support all of the enhanced features described here and, therefore, one or more of the elements depicted in FIG. 3 may be omitted from a practical embodiment. Moreover, a practical implementation of the marking station 300 will include additional elements and features that support conventional functions and operations.

The processor architecture 302 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 302 may be realized as one or more microprocessors, controllers, microcontrollers, or state machines. Moreover, the processor architecture 302 may be implemented as a combination of computing devices, e.g., a combination of digital signal processors and microprocessors, a plurality of microprocessors, one or more microprocessors in conjunction with a digital signal processor core, or any other such configuration.

The video stream analysis module 304 is suitably configured to perform analysis of a video stream as a whole and/or each individual frame of video contained within a video stream. In some embodiments, this analysis is performed to determine segment boundaries within a reference video stream 103, as depicted in FIG. 1. In some embodiments, the analysis may be performed to determine the number of segment boundaries, timing information for each individual segment boundary, and/or average luminance values for each individual frame of video contained within a video stream. Data obtained from a reference video stream 103 may be referred to as reference video stream metadata 105, depicted in FIG. 2.

The output generator 306 is suitably configured to receive and format data obtained by the video stream analysis module 304. In some embodiments, the data is formatted into an output stream suitable for transmission to one or more comparison stations located in one or more video broadcast regions. The output stream, therefore, conveys the reference video stream metadata in an appropriate format that can be received and processed by the comparison stations.

The memory element 308 may be realized using any number of devices, components, or modules, as appropriate to the embodiment. Moreover, the marking station 300 could include a memory element 308 integrated therein and/or a memory element 308 operatively coupled thereto, as appropriate to the particular embodiment. In practice, the memory element 308 could be realized as RAM memory, flash memory, EPROM memory, EEPROM memory, registers, a hard disk, a removable disk, or any other form of storage medium known in the art. In certain embodiments, the memory element 308 includes a hard disk, which may also be used to support functions of the marking station 300. The memory element 308 can be coupled to the processor architecture 302 such that the processor architecture 302 can read information from, and write information to, the memory element 308. In the alternative, the memory element 308 may be integral to the processor architecture 302. As an example, the processor architecture 302 and the memory element 308 may reside in a suitably designed ASIC.

The memory element 308 can be used to store and maintain information for use by the marking station 300. For example, the memory element 308 may be used to store recorded content such as broadcast program events and a library of downloaded advertisements or commercials. The memory element 308 may also be utilized to store data concerning the reference video stream, which may include data detailing marked segment boundaries, or other timing information of interest, within the reference video stream.

Of course, the memory element 308 may also be used to store additional data as needed to support the operation of the marking station 300.

The user interface 310 may include or cooperate with various features to allow a user to interact with the marking station 300. Accordingly, the user interface 310 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the marking station 300. For example, the user interface 310 could be manipulated by an operator to mark the boundaries or transitions between segments of a video stream, as described above.

The communication module 312 is suitably configured to receive and perform processing on signals received by the marking station 300 and to transmit signals from the marking station 300. The communication module 312 is used to communicate data between the marking station 300 and one or more comparison stations (see, for example, FIG. 2). As described in more detail below, data received by the communication module 312 may include, without limitation: metadata associated with reference video streams, such as average luminance values for video frames and/or segments and timing information for video segment boundaries, and the like. Data provided by the communication module 312 may include, without limitation: timing data corresponding to individual video frames, data corresponding to segment boundaries, and/or average luminance values for individual video frames within a reference video stream. The communication module 312 may leverage conventional design concepts that need not be described in detail here.

Figure 4:
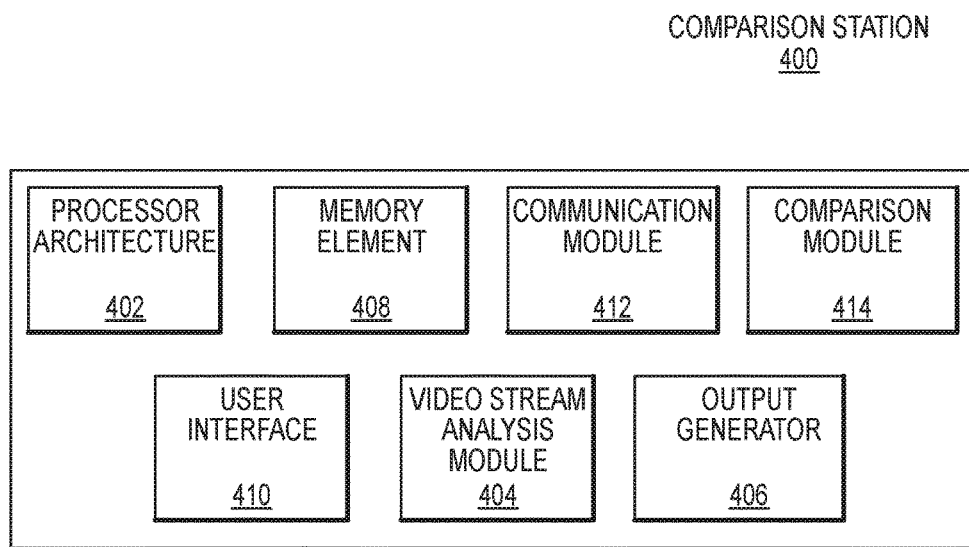
FIG. 4 is a schematic block diagram representation of an embodiment of a comparison station suitable for use in the system shown in FIG. 2.

FIG. 4 is a schematic block diagram representation of an embodiment of a comparison station 400, which is suitable for use in the system shown in FIG. 2. The comparison station 400 can be realized as a computer-based component or system. The illustrated embodiment of the comparison station 400 generally includes, without limitation: a processor architecture 402, a video stream analysis module 404, a comparison module 414, an output generator 406, a memory element 408, a user interface 410, and a communication module 412.

In some embodiments, a comparison is performed at the comparison station 400, which is configured to receive reference video stream data, parse and store data for a video stream of interest, compare the reference video stream data to data for the video stream of interest, determine a plurality of segment boundaries for the video stream of interest based upon the comparison, and to transmit announcement data comprising at least the determined plurality of segment boundaries to a plurality of video service receivers. Additionally, the comparison station may be configured to determine timing information for one or more in-video advertising placement opportunities, and transmitting this timing information to a plurality of video services receivers.

The processor architecture 402, the video stream analysis module 404, the memory element 408, the user interface 410, the communication module 412, and the output generator 406 are similar in configuration and function to their counterpart items described above in the context of the marking station 300. Accordingly, common features and operations of these elements of the comparison station 400 will not be redundantly described here. However, in some embodiments, the type of information and the format of the data provided by the output generator 406 are different than that provided by the marking station 300. For example, the output of the comparison station 400 may include an announcement stream containing characterizing metadata for the video stream of interest.

The comparison module 414 is suitably configured to compare reference video stream metadata that has been received by the comparison station 400 with a video stream of interest to generate an announcement stream including timing information for use by the video services receivers in the respective video broadcast region. In this context, the output generator 406 cooperates with the comparison module 414 to generate the output announcement stream that conveys the desired timing information that identifies the segment boundaries of the video stream of interest.

The communication module 412 of the comparison station 400 is suitably configured to receive and perform processing on signals received by the comparison station 400 and to transmit signals from the comparison station 400. The communication module 412 is used to communicate data between the comparison station 400 and one or more video services receivers (see, for example, FIG. 2). As described in more detail below, data received by the communication module 412 may include, without limitation: media content, such as a video stream of interest, reference video stream metadata, etc.; user commands associated with the operation of the comparison station 400; data related to the use of video services receivers and/or a marking station in the system; or the like. Data provided by the communication module 412 may include, without limitation: timing data corresponding to individual video frames, timing data corresponding to segment boundaries, average luminance values for individual video frames within a video stream of interest, an announcement stream consisting of relevant timing data associated with specific video broadcast content. The communication module 412 may leverage conventional design concepts that need not be described in detail here.

Figure 5:
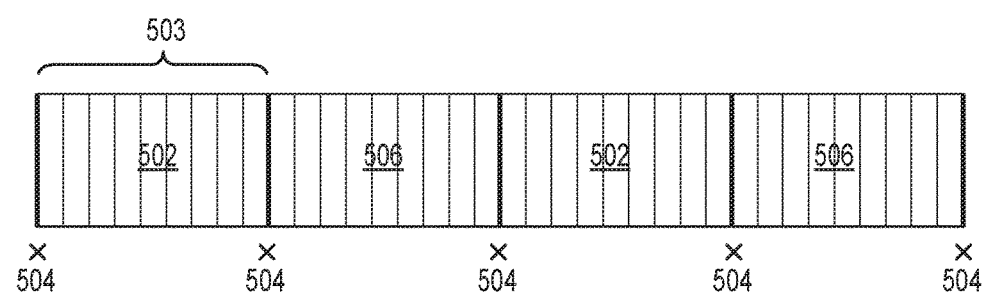
FIG. 5 is a schematic representation of an exemplary video stream having a plurality of segments.

FIG. 5 is a schematic representation of a portion of a video stream 500. The video stream 500 may include any number of video segments, which may be defined or designated in any desired way. The simplified example depicted in FIG. 5 includes video segments 502 separated by interstitial content segments 506 (e.g., advertisements, commercial content, or the like). As another example, a video stream could be arbitrarily separated into any number of segments in the absence of any interstitial content. In this regard, a commercial-free program could be segmented into any number of chapters, parts, or sections. For ease of description, FIG. 5 depicts segment boundary marks 504 that represent the boundary or transition between two adjacent segments.

Each video segment 502 generally includes a plurality of individual video frames 503 containing video content. Each individual video frame 503 is associated with an average luminance value, a Program Clock Reference (PCR) value, a Presentation Time Stamp (PTS) value, and other characterizing metadata. Each video frame may be defined by, or is otherwise associated with a plurality of pixels, and the brightness of individual pixels may be described using luminance values. In some embodiments, the average luminance value of a particular video frame may be determined using un-compressed pixel data provided by High-Definition Multimedia Interface (HDMI) technology. For example, designated hardware within the video broadcast region extracts the luminance values of each pixel within a video frame directly from the HDMI data, sums the luminance values, and disregards the lower order bits of the summed value, effectively performing a mathematical division operation. The remaining bits provide a representation of average luminance for an individual video frame. In other embodiments, Serial Digital Interface (SDI) technology, High Definition Serial Data Interface (HD-SDI) technology, and/or a CCIR656 Standard Definition digital representation of analog broadcasts, is used to obtain the average luminance values of individual video frames. In other embodiments, luminance values may be directly calculated from an MPEG stream, or its decoded frames in a buffer. In addition, a sum of the luminance values may be used for further calculation and comparison without performing an average, as long as the reference video stream and the video stream of interest have the same resolution.

The segment boundary marks 504 are indications that a video segment 502 has ended or will begin at the point where the segment boundary mark 504 is placed. In some embodiments, segment boundary marks 504 may be placed manually, by a human operator. This "manual" marking may include an actual notation within the video stream 500 itself, or may include a separate recording of information relevant to the characterizing metadata associated with the placement of the segment boundary mark 504.

Video segments 502 are generally separated by advertising content 506. Similar to video segments 502, advertising content 506 is realized with individual video frames 503 with their associated characterizing metadata.

Figure 6:
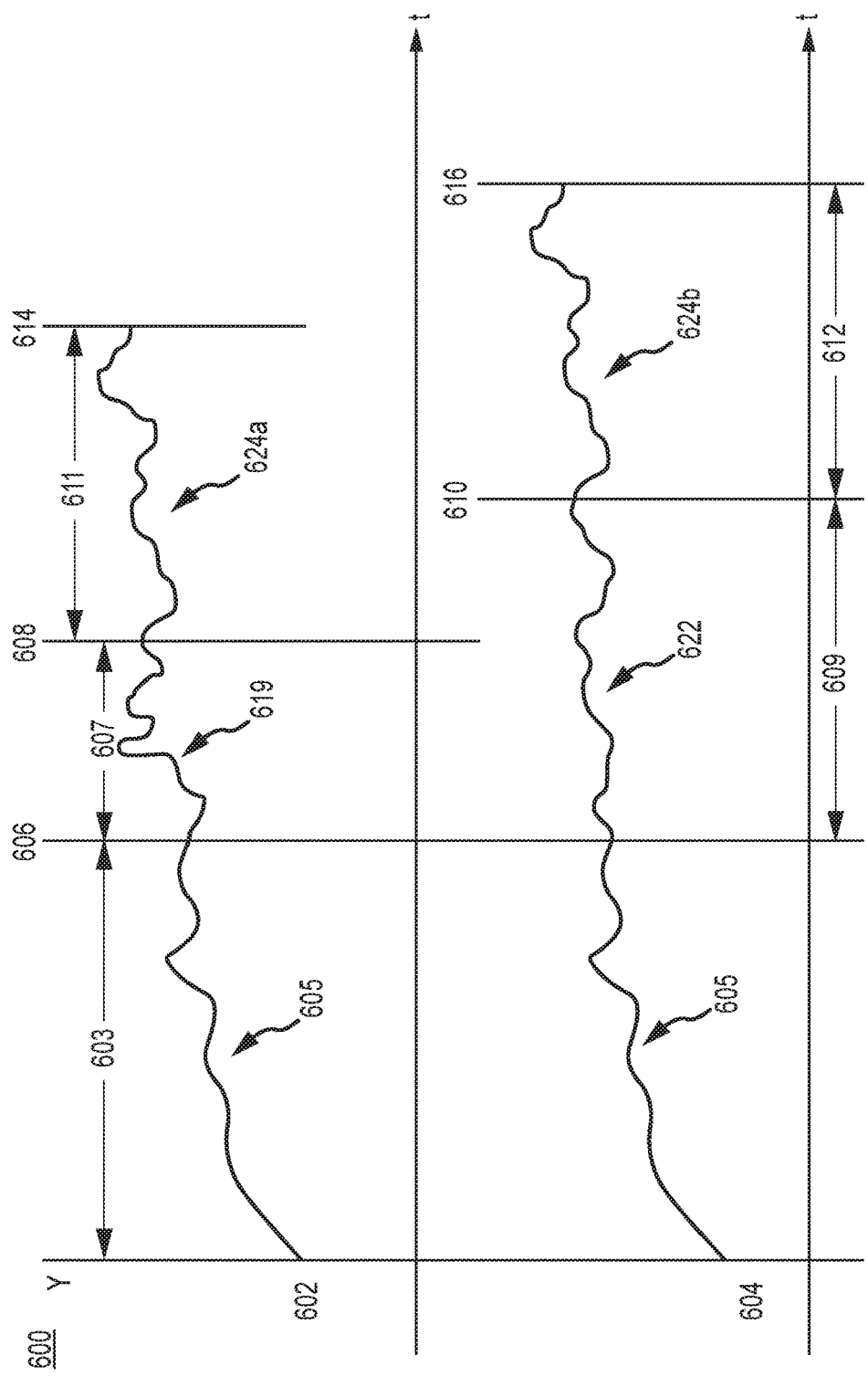
FIG. 6 depicts two plots of average luminance values per video frame versus time, for a video stream broadcast in two different video broadcast regions.

FIG. 6 depicts two plots of average luminance values per frame versus time. The graph 600 depicts a representation of average luminance values for a reference video stream 602, and a representation of average luminance values for a corresponding video stream of interest 604. Also represented within the graph 600 are segment boundaries 606, 608, 610, 614, 616. Segment boundary 606 marks the end of a time period 603 containing a video segment 605. This segment boundary 606 also marks the beginning of a commercial break 619 in the reference video stream 602. The commercial break 619 corresponds to a time period 607 associated with the reference video stream 602. Segment boundary 608 marks the end of the time period 607 for the commercial break 619. Accordingly, a section of the reference video stream 602 corresponds to commercial or advertising content that appears during the time period 607. The end of this advertising content is unique to the reference video stream 602, and, therefore, the segment boundary 608 does not apply to the video stream of interest 604. Rather, the video stream of interest 604 includes a different segment boundary 610, which marks the end of its own advertising content 622, which may differ, wholly or partially, from the commercial break 619 content associated with the reference video stream 602. In this regard, FIG. 6 depicts a section of the video stream of interest 604 that corresponds to the commercial or advertising content that appears during the time period 609. Note that the time period 609 is longer than the time period 607.

The time period 611 for the reference video stream 602 follows the segment boundary 608. For this example, the time period 611 corresponds to a time during which a second video segment 624a is presented in the reference video stream 602. In this regard, the second video segment 624a follows the commercial break 619. Likewise, the time period 612 for the video stream of interest 604 follows the segment boundary 610. The time period 612 corresponds to a time during which the second video segment 624b is presented in the video stream of interest 604. Thus, the second video segment 624b follows the advertising content 622. It should be appreciated that the second video segments 624a, 624b are equivalent to one another, but offset in time due to the different lengths of the commercial breaks. Accordingly, if the time offset is considered, then the average luminance values for the second video segment 624a are theoretically equal to the average luminance values for the second video segment 624b.

Because the advertising content ends at different times for the reference video stream 602 and the video stream of interest 604, the waveforms are not identical throughout the duration of the time period illustrated. However, as shown, the waveforms are identical within the time period 603, and are identical within the time periods 611, 612. The differences in the waveforms appear during the time periods 607, 609 containing the advertising content, or commercial breaks within the video streams. In other words, following the commercial breaks, segment boundaries 608, 610 mark the beginning of identical waveform sections, illustrating a timing offset from segment boundary 608 to segment boundary 610.

Figure 7:
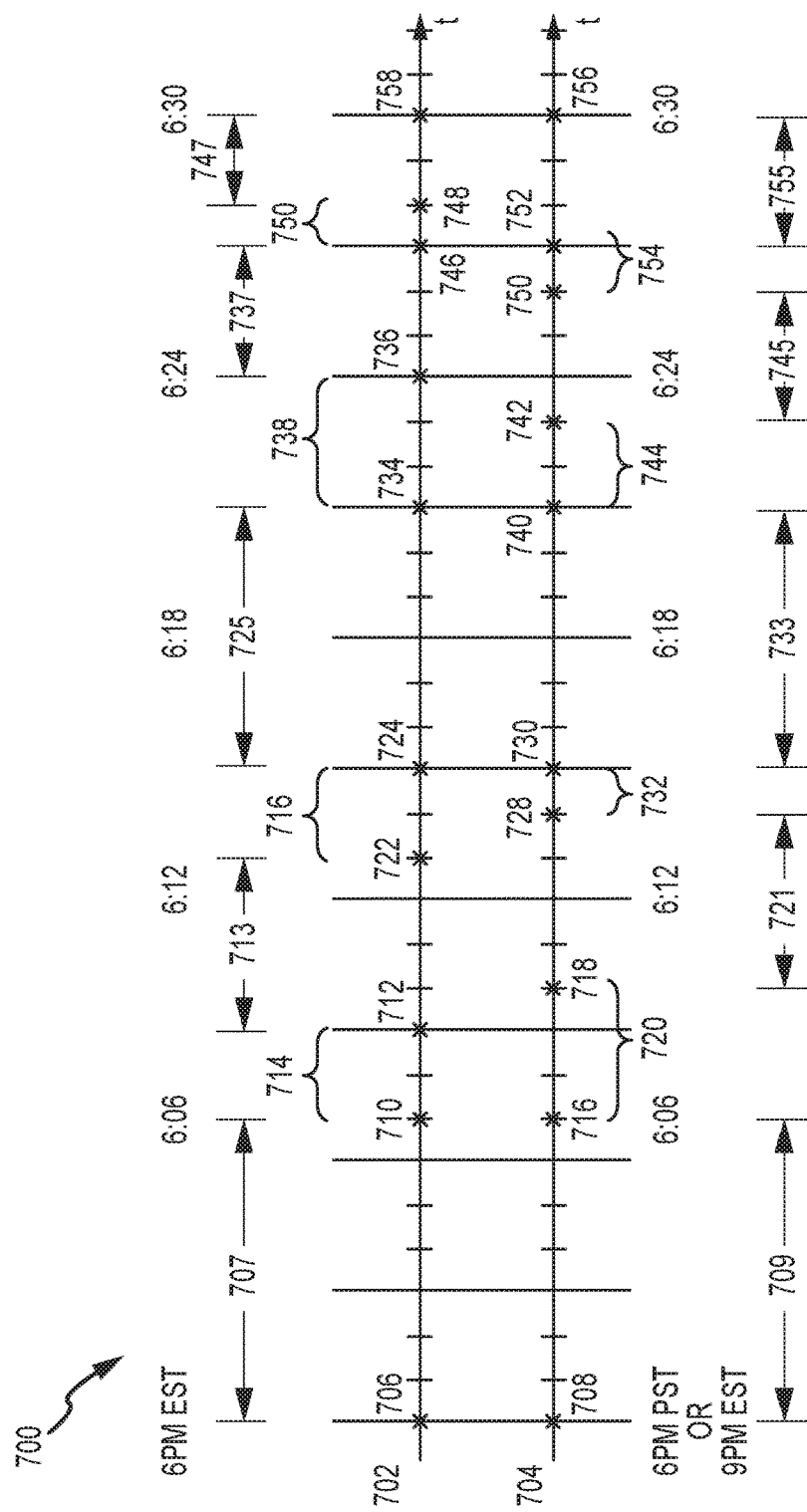
FIG. 7 is a schematic timeline representation of two video streams with markings depicting offset.

FIG. 7 is a schematic timeline representation of two video streams with markings depicting a timing offset for commercial breaks within video broadcast content. The timeline representation 700 depicts two separate video streams 702, 704. Both video streams 702, 704 contain the same initial video segments, as described above with reference to FIG. 5 and FIG. 6, but contain advertising content that is unique to each of the video streams 702, 704 and are broadcast in two separate time zones.

A reference video stream 702 is illustrated, along with a video stream of interest 704. The reference video stream 702 is broadcast at 6 pm Eastern Standard Time (EST), while the video stream of interest 704 is broadcast at 9 pm EST (or 6 pm Pacific Standard Time (PST)). The timeline representation 700 contains markings at various points in time. The first set of markings 706, 708 mark the beginning of the first video segments 707, 709. The rest of the markings on the timeline represent segment boundaries in the video streams 702, 704, or the points in time when the video segments begin or end immediately preceding or following advertising content.

As shown in FIG. 7, the second set of markings 710, 716 for both video streams 702, 704 align in time, the marking on the reference video stream 702 occurring at 6:07 pm EST and the marking on the video stream of interest occurring at 6:07 pm PST. The third set of markings 712, 718 are not aligned in time. As shown, the third marking 712 in the reference video stream 702 occurs at a point in time approximately one minute prior to the occurrence of the third marking 718 in the video stream of interest 704. This is due to the timing offset created by a longer commercial break 720 in the video stream of interest 704. In this particular example, the reference video stream 702 commercial break 714 has a duration of approximately two minutes, whereas the video stream of interest 704 commercial break 720 has a duration of approximately three minutes. In this example, this creates a one-minute offset to the beginning of the second segment 721 of video broadcast content within the video stream of interest 704. The second segment 713 of video broadcast content within the reference video stream 702 begins at approximately 6:09 pm EST, while the second segment 721 of video broadcast content within the video stream of interest 704 begins at approximately 6:10 pm PST, as shown.

The timing offset (one minute in this example) created by the varying durations of the first commercial breaks 714, 720 may or may not remain uniform throughout the rest of the video broadcast content. For example, the fourth set of markings 722, 728, which represent segment boundaries at the beginning of commercial breaks 726, 732, begin at different times due to the one-minute timing offset of video segments 713, 721 discussed above. However, the second commercial breaks 726, 732 are also of varying durations, and this will alter the overall timing offset of the video broadcast content within the video streams 702, 704 again. In this particular example, the reference video stream 702 commercial break 726 has a duration of approximately two minutes, whereas the video stream of interest 704 commercial break 732 has a duration of approximately one minute. In this example, this eliminates the one-minute offset created by the first commercial breaks 714, 720. The third segments 725, 733 of video broadcast content within both video streams 702, 704 are aligned in time, the third segment of the reference video stream 702 beginning at approximately 6:15 pm EST, and the third segment of the video stream of interest 704 beginning at approximately 6:15 pm PST, as shown.

Figure 8:
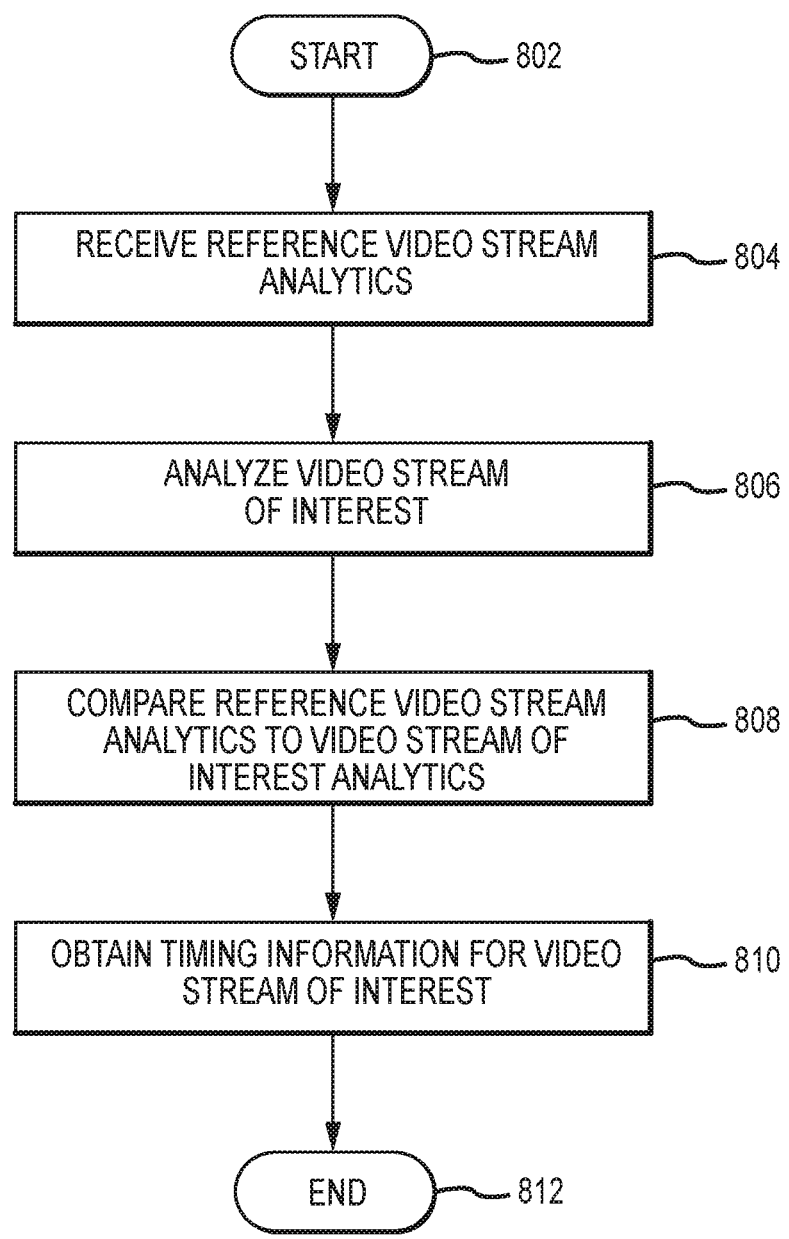
FIG. 8 is a flow chart that illustrates an embodiment of a method for determining timing information for a video stream.

FIG. 8 is a flow chart that illustrates an embodiment of a method for determining timing information for a video stream. This method 800 is one suitable embodiment of a method for creating an announcement stream for a designated market area. The various tasks performed in connection with a process described here may be performed by software, hardware, firmware, or any combination thereof. For illustrative purposes, the description of a process may refer to elements mentioned above in connection with FIG. 1 through FIG. 7. In practice, portions of a described process may be performed by different elements of the described system, e.g., the system firmware, logic within a marking station, logic within a comparison station, or other logic in the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

In some embodiments, a marking station is configured to parse, store data for, and transmit data from, a reference video stream, wherein the reference video stream comprises a plurality of video frames. Data for the reference video stream may be referred to as reference stream analytics, characterizing metadata, etc. In some embodiments, the marking station is further configured to associate timing information with average luminance values for a plurality of video frames.

For ease of description and clarity, this example assumes that the method 800 begins when reference video stream analytics are received (step 804). Generally, the reference video stream analytics are received at a designated computer system (such as a comparison station as previously described) within a video broadcast region. In some embodiments, reference video stream analytics include or are represented by characterizing metadata for a reference stream. In some embodiments, reference video stream analytics may include discrete, individual data points (depicted as a waveform for ease of illustration) depicting characterizing metadata, which may be based upon average luminance values for each of a plurality of video frames contained within the reference video stream, timing information regarding individual video frames and/or segment boundaries within the reference video stream, and the like.

After receiving the reference video stream analytics (step 804), analysis of a video stream of interest is performed (step 806). The video stream of interest is analyzed to obtain analytics, or characterizing metadata, that describes certain aspects of the video stream of interest. Similar to the characterizing metadata for the reference video stream, the characterizing metadata for the video stream of interest may be associated with average luminance values for individual video frames, timing information regarding individual video frames and/or segment boundaries within the video stream, etc. In some embodiments, average luminance values for each of a plurality of video frames contained within a video stream of interest are calculated and discrete, individual data points (depicted as a second waveform, for ease of illustration) are generated using the calculated luminance values.

Once reference video stream analytics have been received (step 804) and the video stream of interest has been analyzed (step 806), the reference video stream analytics are then compared to the video stream of interest analytics (step 808). In some embodiments, the comparison performed during step 808 includes: (i) obtaining an absolute difference between the average luminance values for each of the individual video frames of the reference video stream and each of the individual video frames for the video stream of interest; (ii) summing the results (i.e., the absolute difference values) for each of the individual video frames; and (iii) comparing the summed value to a predefined threshold value. In certain embodiments, the summed value is then divided by the number of individual video frames in the plurality to obtain an average value, and the average value is compared to the pre-determined threshold value. These processing steps may be performed in an iterative manner, beginning at any arbitrary timing reference between the two video streams. If the summed value is not lower than the threshold value, then some amount of timing offset is introduced between the two video streams before the comparison is performed again. When the summed value (or, in some cases, the average value) is lower than the threshold value, the method continues by generating offset data for the video stream of interest.

The predefined threshold value represents the amount of allowable error between the average luminance values of the reference video stream and the average luminance values of the video stream of interest. Ideally, when the individual video frame or plurality of video frames within a reference video stream are compared to an individual video frame or plurality of video frames within a video stream of interest, the average luminance values for each video stream would be the same. In other words, in an ideal situation, the difference value (or sum of difference values) obtained when the average luminance values of the reference video stream are compared to the average luminance values of the video stream of interest would all be equal to zero. When the average luminance values are equal, or fall within a pre-defined, acceptable threshold of maximum error, the video frame or plurality of video frames satisfies the criteria of a match.

When the difference value (or sum of difference values) does not fall within the predefined threshold of acceptable error, the video frame or plurality of video frames does not satisfy the criteria of a match, and the method moves on to the next video frame or plurality of video frames, within the video stream of interest, for evaluation. The next video frame or plurality of video frames in the video stream of interest is then compared to the same video frame or plurality of video frames within the reference video stream that was used in the previous comparison. In this example, the objective is to locate a "match" for the section of the reference stream in question by evaluating different sections of the video stream of interest until the "match" is found.

Comparing a reference video stream with a video stream of interest may begin at a location within the video streams when both video streams are at their earliest point, i.e., the position in each video stream corresponding to the beginning of the video broadcast content in question. In some embodiments, at least one of the video streams is longer in duration than the video broadcast content, and the earliest point in the video stream occurs before the actual beginning of the video broadcast content. In this example, the comparison may begin at an individual video frame located at a new, earlier point in time than the beginning of the video broadcast content contained within the relevant video stream.

As one example, a reference video stream includes four video segments with segment boundaries marking the beginning and ending points of each video segment. The video segments are also separated by advertising content contained within commercial breaks. A video stream of interest includes the same four video segments, and segment boundaries which may differ due to different timing data. In this example, the timing data of each segment boundary may be unknown, including the segment boundary at the beginning of the first video segment. In order to determine the timing data for the segment boundary at the beginning of the first video segment, the comparison of the two video streams may begin, within the video stream of interest, at a point earlier in time than the video broadcast content begins within the reference video stream. The video stream of interest may contain video frames with timing data that is earlier in time than the beginning of the first video segment, and the comparison of the reference video stream with the video stream of interest may determine the timing information of the first segment boundary, at the beginning of the first video segment.

Comparing a reference video stream with a video stream of interest may occur in a forward direction, a reverse direction, or a combination of the two directions. In some embodiments, the comparing progresses in a time-forward direction, wherein the comparing in the time-forward direction comprises comparing individual video frames sequentially. The comparison begins with an individual video frame of both video streams to be compared, comprising timing information that is early in time, progressing frame-by-frame from earlier timing information to later timing information, and completing the comparing process with an individual video frame comprising timing information that is late in time.

In some embodiments, the comparing progresses in a time-reverse direction, wherein the comparing in the time-reverse direction comprises comparing individual video frames sequentially. The comparison begins with an individual video frame of both video streams comprising time information that is late in time, progressing frame-by-frame from later timing information to earlier timing information, and completing the comparing process with the individual video frame comprising timing information that is early in time.

The objective of the comparing step is to obtain a "match" between the average luminance values of individual video frames or a plurality of video frames corresponding to a given segment of interest. Individual video frames or groups of video frames from the reference video stream are matched to individual video frames or groups of video frames from the video stream of interest. Once this "match" has been located, additional timing information may be read directly from the video stream of interest, using the "match" as a beginning reference point.

After the reference video stream analytics have been compared to the video stream of interest analytics (step 808), timing information for the video stream of interest is obtained (step 810), and in some embodiments, recorded. In some embodiments, the recording of the timing information for the video stream of interest occurs within a memory element, wherein the memory element is coupled to a processor architecture. Timing information may include detail regarding segment boundaries within the video stream of interest, detail regarding advertising content timing and/or video frame timing locations, detail regarding individual video frames, etc.

In some embodiments, the step of obtaining timing information for the video stream of interest (step 810) occurs for a plurality of segments within a video stream. In other embodiments, the obtaining step (step 810) occurs at intervals throughout a video stream, wherein the intervals comprise equivalent lengths of time. In some embodiments, timing information is generated regarding the beginning and ending of at least one portion of a video stream, using offset data. In practice, therefore, the timing information for the video stream of interest will indicate the boundaries between segments of video content, commercial breaks, interstitial content, and the like, or the timing information may indicate appropriate timing, within a video stream, for product placement advertising opportunities, as determined using the luminance-based approach presented herein.

In some embodiments, once the timing information for the video stream of interest has been obtained (step 810), this timing information is transmitted to a plurality of video services receivers. Thereafter, the video services receivers can utilize the timing information to quickly and easily identify the segment boundaries during playback of a recorded version of the video stream of interest. Identifying the boundaries may be desirable to skip over commercial content, to reduce the volume of specified segments, to speed up playback of specified segments, to delete advertisements, to insert replacement video content between other video segments, etc. In certain embodiments, video services receivers can utilize the timing information to identify points within a video stream where intelligent advertising, or product placement opportunities, occur. In other embodiments, video services receivers can utilize the timing information to identify segments that cannot be skipped or fast-forwarded.

Figure 9:
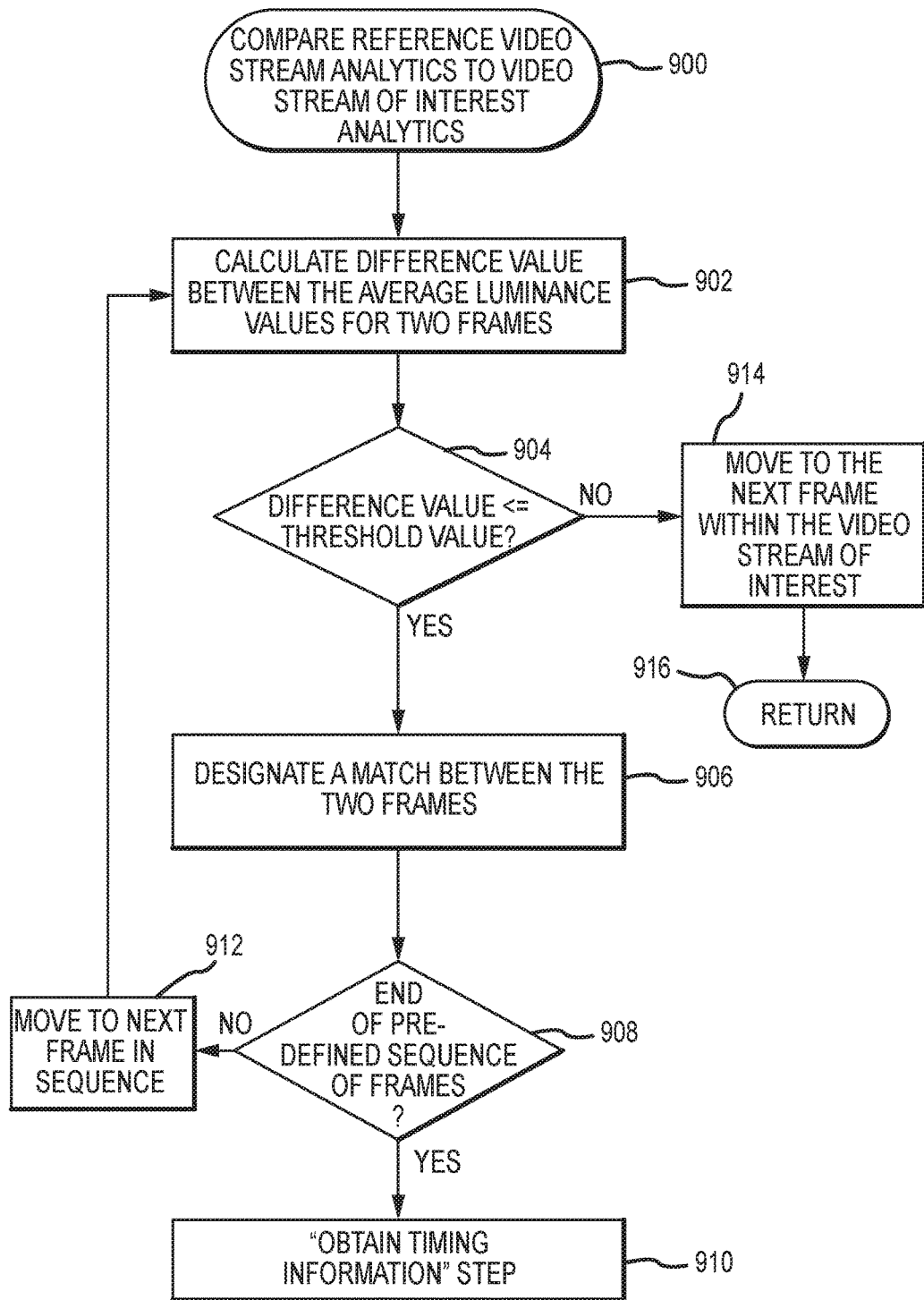
FIG. 9 is a flowchart that illustrates an embodiment of a luminance-based method for comparing video frames.

FIG. 9 is a flowchart that illustrates one exemplary embodiment of the comparing step 808 depicted in FIG. 8. This particular embodiment utilizes characterizing metadata, including average luminance values, to perform a frame-by-frame comparison between a reference video stream and a video stream of interest. As shown, the process 900 begins when average luminance values for a frame within a reference video stream and a frame within a video stream of interest have been obtained, and a difference value between the two average luminance values is calculated (step 902).

In certain situations, the calculated difference value would be equal to zero, due to average luminance values for each of the two video streams being the same. In such a scenario, the two video frames at issue would be labeled a "match". In other scenarios, when the average luminance values are not the same, the difference value must be less than or equal to a pre-determined threshold value to be labeled a "match". Accordingly, the threshold value represents the amount of acceptable error within the comparison process 900. If the difference value is not less than or equal to the threshold value (the "No" branch of 904), then the frames are not declared a "match", and the method moves on to the next frame in sequence (step 914) within the video stream of interest, and begins the comparing process again (step 916) using the same video frame within the reference video stream as was used in the previous comparison. Within the comparison step, the video frame in the reference video stream will remain the same, while the video frame within the video stream of interest will be varied until a "match" is located. In some embodiments, the next frame in sequence within the video stream of interest, for comparison, is variable and may be changed by a system operator. In some embodiments, the method moves on to the next frame in sequence in the video stream of interest, continuing the comparison throughout the video broadcast content until a match is found or the end of the video stream is reached. Further, in some embodiments, after locating an initial match, the process 900 may iterate through a defined portion of the video stream of interest, which may include the entire video stream of interest or any subset thereof, to seek out the "best" match.

Once the difference value between the two average luminance values is calculated (step 902), the difference value is then compared to a pre-determined threshold value (step 904). If the difference value is less than or equal to the threshold value (the "Yes" branch of 904), the process 900 designates a "match" (step 906). Next, the process 900 determines whether the "matched" video frame is the last video frame within a pre-defined sequence of video frames (step 908), and if so (the "Yes" branch of 908), the process 900 moves on to the step "obtain timing information" 810 depicted in FIG. 8 (step 910). In certain embodiments, the pre-defined sequence of video frames is a segment of a television program. In other embodiments, however, the pre-defined sequence of video frames is a design decision, and may include any one or more video frames, as determined by the designer. In some embodiments, the pre-defined sequence of video frames may include a first plurality of video frames at the beginning of a segment and a second plurality of video frames at the end of the same segment. In this case, when the first and second pluralities of video frames are analyzed for differences in average luminance values, the video stream of interest is effectively sampled.

If the "matched" video frame is not the last video frame within a pre-defined sequence of video frames (the "No" branch of 908), the process 900 moves to the next frame in the pre-defined sequence (step 912) and returns to the beginning of the process 900 (step 902).

Figure 10:
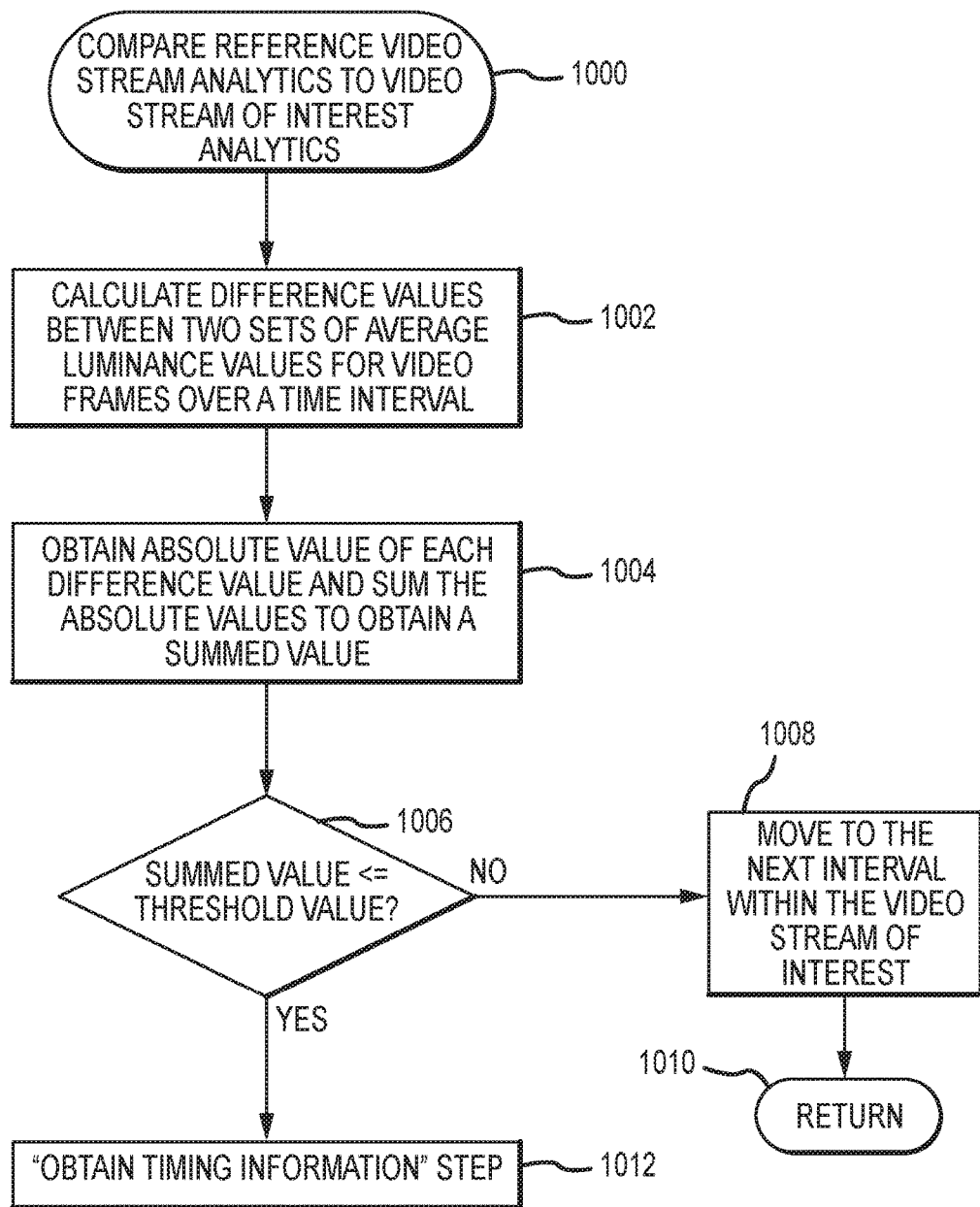
FIG. 10 is a flowchart that illustrates another embodiment of a luminance-based method for comparing video frames.

FIG. 10 is a flowchart that illustrates another exemplary embodiment of the comparing step 808 depicted in FIG. 8. This particular embodiment utilizes characterizing metadata, including average luminance values, to perform a comparison of multiple frames over a time interval, between a reference video stream and a video stream of interest.

As shown in FIG. 10, two sets of average luminance values over a specified time interval have been obtained, and difference values between the two sets of average luminance values is calculated (step 1002). One set of average luminance values is for a plurality of video frames within a reference video stream over the specified time interval, and the second set of average luminance values is for a plurality of video frames within a video stream of interest over the specified time interval. An absolute value for each of the difference values is calculated, and the absolute difference values are then summed to obtain a summed value (step 1004), and the summed value is compared to a pre-determined threshold value (step 1006). In certain embodiments, the summed value is then divided by the number of individual video frames in the plurality to obtain an average value, and the average value is compared to the pre-determined threshold value. If the summed value (or, in some cases, the average value) is less than or equal to the pre-determined threshold value, a "match" is declared, and the method moves on to the step "obtain timing information" 810, as depicted in FIG. 8 (step 1012). However, in some embodiments, after locating an initial match, the process 1000 may iterate through a defined portion of the video stream of interest, which may include the entire video stream of interest or any subset thereof, to seek out the "best" match, before moving on to obtain timing information (step 1012).

In some situations, the calculated result would be equal to zero, due to average luminance values for each of the two video streams being the same. Accordingly, the two video segments at issue would be labeled a "match". In other scenarios, when the average luminance values are not the same, the calculated result must be less than or equal to a pre-determined threshold value to be labeled a "match". In this embodiment, the threshold value represents the amount of acceptable error within the comparison process 1000.

If the absolute value of the difference value is not less than or equal to the threshold value, or in other words, close enough to zero, then the video frames over the specified interval of time are not declared a "match", and the method moves on to the next set of frames within the video stream of interest, beginning at a specified point in time within the video stream of interest, sequentially (step 1008), and begins the comparing process again (step 1010). In some embodiments, the next frame in sequence within the video stream of interest, for comparison, is variable and may be changed by a system operator. In some embodiments, the method moves on to the next frame in sequence within the video stream of interest, continuing the comparison throughout the video broadcast content until a match is found or the end of the video stream is reached. In some embodiments, the method moves on to the next video frame within the video stream of interest in a pre-defined time period.

In some embodiments, the specified time interval is equal to the duration of a segment of the broadcast video content contained within a reference video stream. Once difference values are obtained for a first segment, they are summed to calculate a summed value for the first segment, and the comparison station 400, shown in FIG. 4, varies the start time of a specified interval of time until a "match" is declared. This process is repeated for each segment within the video broadcast content of a reference video stream.

Figure 11:
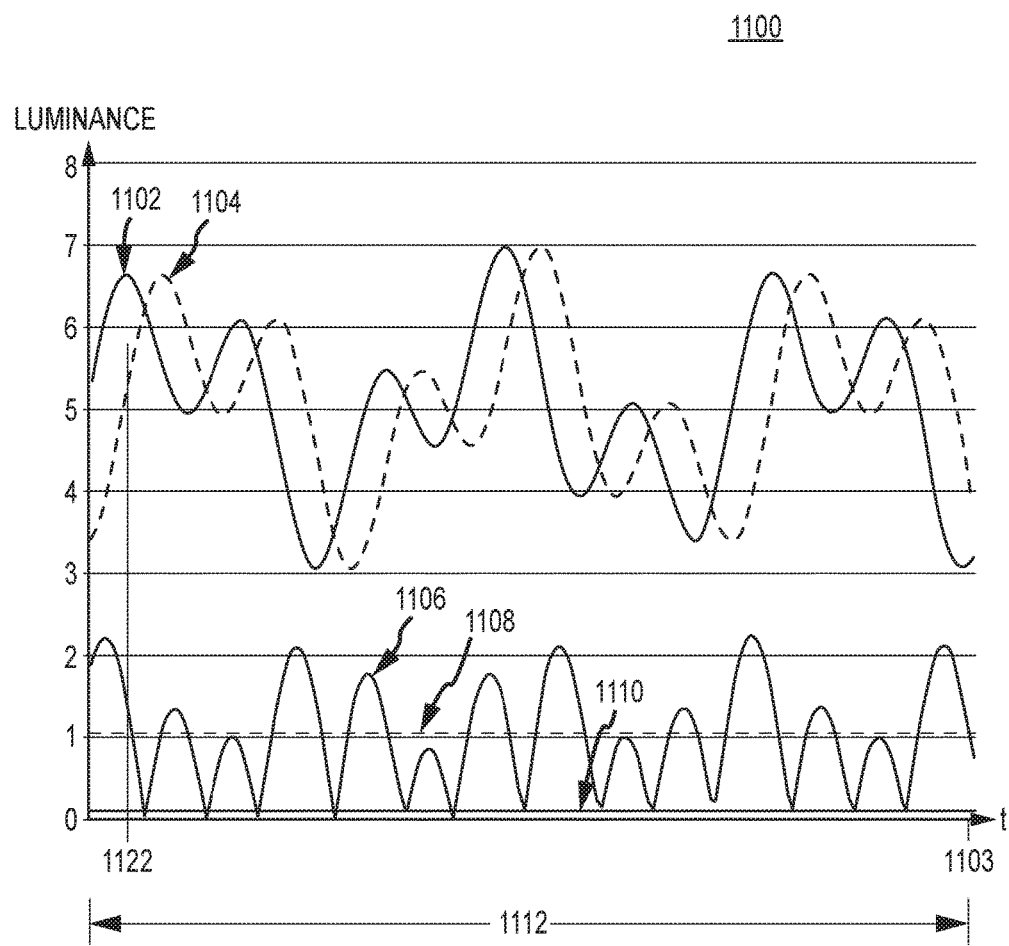
FIGS. 11-13 depict four plots of average luminance values per video frame versus time, for a reference video stream and two iterations of time-value adjustment for a video stream of interest.
Figure 12:
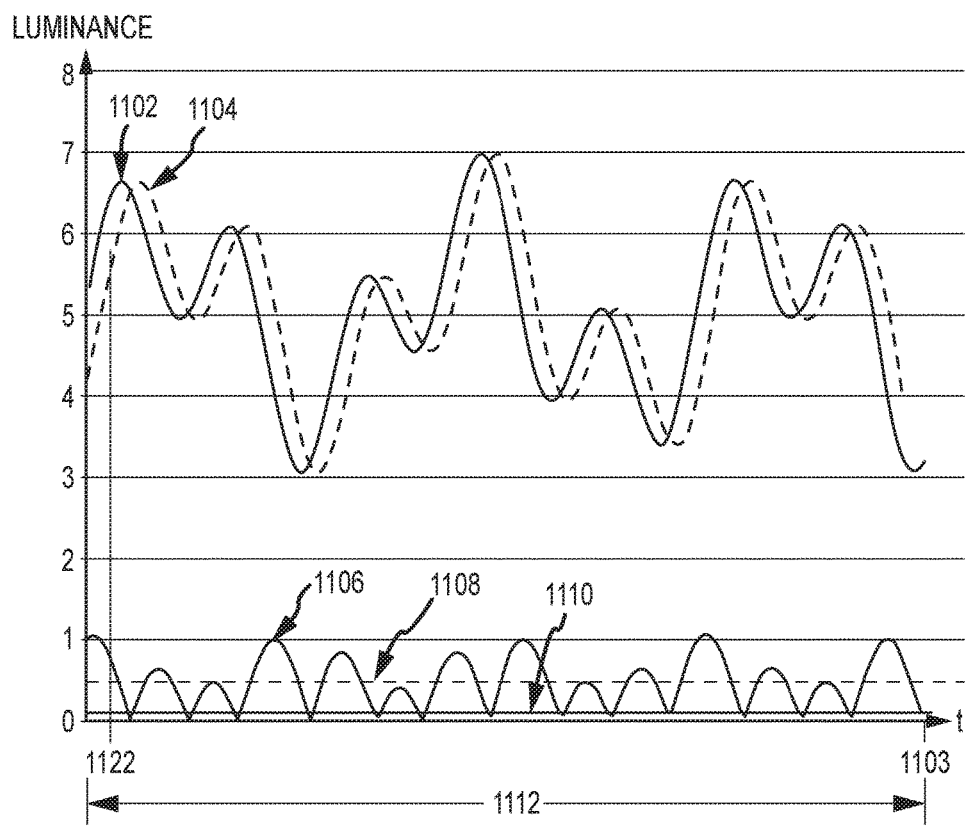
Figure 13:
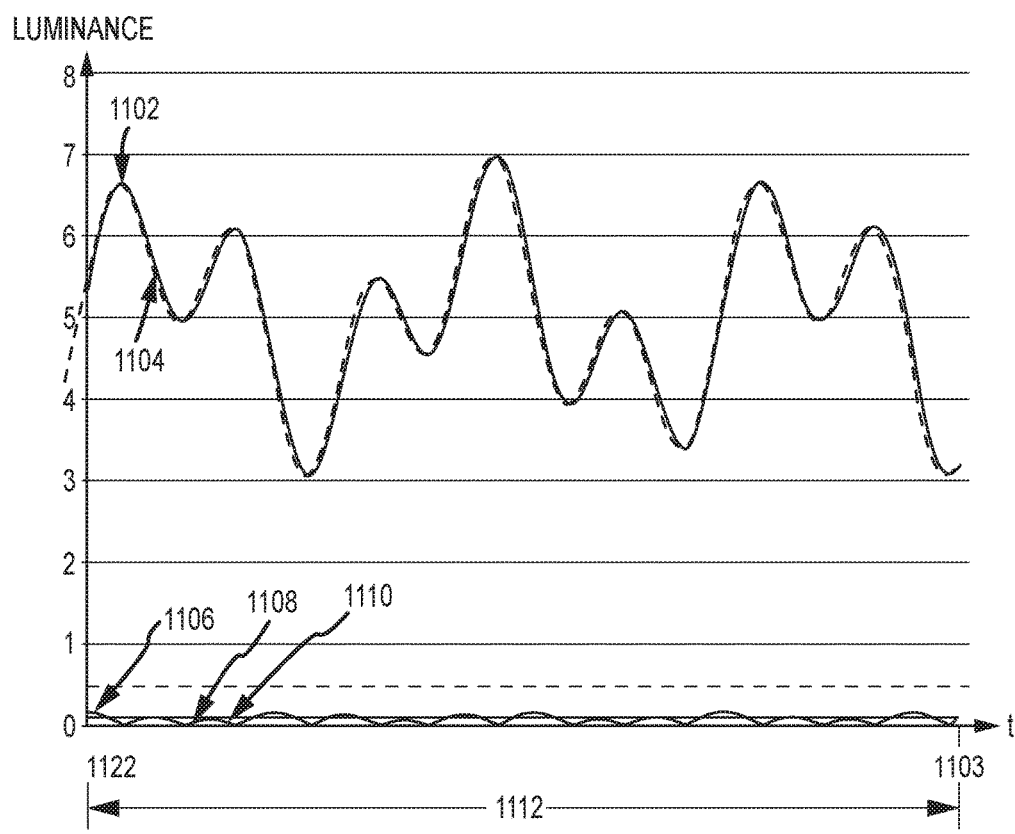

FIGS. 11-13 depict an exemplary embodiment of the comparing step 808 depicted in FIG. 8. FIGS. 11-13 show four plots of average luminance values per video frame versus time, for a reference video stream and three iterations of time-value adjustment for a video stream of interest.

FIG. 11 illustrates plot 1100, showing a reference video stream 1102 having time duration 1112, and having segment boundaries at the origin and at point 1103. Plot 1100 further illustrates a first iteration of the comparison step, showing a video stream of interest 1104 having time duration 1112 and an initial segment boundary 1122 (the ending segment boundary is not shown). As shown, the video stream of interest 1104 has the same time duration 1112 as the reference video stream 1102, but different segment boundaries. In this example, the comparison occurs at the origin, and the first iteration of the comparison step does not produce the match that is the objective within the comparison step.

Plot 1100 further illustrates an absolute difference 1106 waveform, providing additional detail regarding the offset between the reference video stream 1102 and the video stream of interest 1104, and showing this calculated difference at any point in the waveform. The average of difference 1108 is a flat line, showing the calculated average of the absolute difference 1106 values within a segment of time. Also shown is the pre-defined threshold 1110 for an acceptable difference value at any discrete point on the graph.

FIG. 12 illustrates plot 1130, showing a second iteration of the comparison step, showing the video stream of interest 1104 having an initial segment boundary 1122 (the ending segment boundary is not shown). As shown, the video stream of interest 1104 has been shifted toward the origin, where the comparison begins. Again, the second iteration of the comparison step does not produce the required match between the reference video stream 1102 and the video stream of interest 1104.

Plot 1130 further illustrates a decreased absolute difference 1106, when compared to the absolute difference 1106 shown in Plot 1100. Consequently, the average of difference 1108 is also decreased. Threshold 1110 is also shown, but again, the points on the absolute difference 1106 waveform that fall below the threshold 1110 are few. Here again, the waveforms are not a "match".

FIG. 13 illustrates plot 1140 illustrates a third iteration of the comparison step, showing the video stream of interest 1104 having time duration 1112 and segment boundaries at the origin and at point 1103. As shown, the video stream of interest 1104 has been shifted toward the origin again. Here, the comparison between the reference video stream 1102 and the video stream of interest 1104 begins at the origin, and a match has been found.

Plot 1140 further illustrates an absolute difference 1106 that meets or falls below the threshold 1110 across the majority of plot 1140. In addition, the average difference 1108 plot is superimposed on the threshold 1110 plot, showing that the average difference 1108 is nearly equal to the threshold value across plot 1140. Thus, a "match" between the reference video stream 1102 and the video stream of interest 1104 has been found.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating an announcement stream for a geographic region, comprising:
receiving, at a designated computer system, characterizing metadata for a first audio/video stream;
analyzing a second audio/video stream to obtain characterizing metadata for the second video stream;
comparing, with the computer system, the characterizing metadata for the first video stream to the characterizing metadata for the second video stream to generate offset data, wherein the comparing progresses in using at least one of a time-forward direction and a time-reverse direction,
wherein the comparing in the time-forward direction comprises:
comparing individual video frames sequentially, beginning with the individual video frame of the second video stream comprising timing information that is earliest in time and completing the comparing process with the individual video frame of the second video stream comprising timing information that is latest in time; and
wherein the comparing in the time-reverse direction comprises:
comparing individual video frames sequentially, beginning with the individual video frame of the second video stream comprising timing information that is latest in time and completing the comparing process with the individual video frame of the second video stream comprising timing information that is earliest in time; and
calculating timing information corresponding to segment boundaries for the second video stream using the offset data.

2. The method of claim 1, wherein the characterizing metadata of the first and second video streams comprises average luminance values corresponding to individual video frames in the first and second video streams.

3. The method of claim 2, wherein the comparing of the characterizing metadata for the first video stream to the characterizing metadata for the second video stream comprises:
subtracting the average luminance values for each of the individual video frames of the second video stream from the average luminance values for each of the individual video frames of the first video stream to obtain a plurality of results;
summing an absolute value of each of the plurality of results, for each of the individual video frames, to obtain a summed value;
dividing the summed value by a total number of individual video frames for the second video stream to obtain a result; and
when the result is lower than a threshold value, generating the offset data by subtracting timing information for the second video stream from timing information for the first video stream.

4. The method of claim 3, wherein the comparing of the characterizing metadata for first video stream to the characterizing metadata for the second video stream further comprises:
beginning the comparing at an individual video frame of the second video stream, wherein the individual video frame of the second video stream comprises timing information that is earlier in time than the timing information for the individual video frame of the first video stream which comprises the earliest timing information for the first video stream.

5. The method of claim 1, wherein the calculating step occurs for a plurality of segments of the second video stream.

6. The method of claim 1, wherein the comparing occurs at a plurality of intervals throughout the second video stream, and wherein each of the plurality of intervals comprises an equivalent length of time.

7. The method of claim 1, further comprising transmitting the timing information to a plurality of video services receivers.

8. The method of claim 1, further comprising recording timing information corresponding to segment boundaries for the second video stream using the offset data.

9. The method of claim 1, wherein the characterizing metadata comprises audio data of the first and second video streams.

10. The method of claim 1, further comprising:
calculating first timing information corresponding to a first segment boundary for the second video stream;
calculating second timing information corresponding to a second segment boundary for the second video stream; and
utilizing the first and second timing information to skip a segment between the first segment boundary and the second segment boundary during video playback of a recorded second video stream.

11. The method of claim 1, further comprising:
calculating first timing information corresponding to a first segment boundary for the second video stream;
calculating second timing information corresponding to a second segment boundary for the second video stream; and
utilizing the first and second timing information to replace a segment between the first segment boundary and the second segment boundary during video playback of a recorded second video stream.

12. The method of claim 1, further comprising:
calculating first timing information corresponding to a first segment boundary for the second video stream;
calculating second timing information corresponding to a second segment boundary for the second video stream; and
utilizing the first and second timing information to insert an overlay between the first segment boundary and the second segment boundary during video playback of a recorded second video stream.

13. The method of claim 1, further comprising:
calculating first timing information corresponding to a first segment boundary for the second video stream;
calculating second timing information corresponding to a second segment boundary for the second video stream; and
utilizing the first and second timing information to designate a segment between the first segment boundary and the second segment boundary, wherein skipping or fast-forwarding the segment is not permitted during video playback of a recorded second video stream.

14. A system for processing video stream data, comprising:
   a communication module, configured to receive characterizing metadata for a first video stream; and
   a processor architecture coupled to the communication module, wherein the processor architecture comprises:
      a video stream analysis module, configured to analyze a second video stream to obtain characterizing metadata for the second video stream; and
      a comparison module, configured to compare the characterizing metadata for the first video stream to the characterizing metadata for the second video stream to generate offset data wherein the comparing progresses in using at least one of a time-forward direction and a time-reverse direction,
      wherein the comparing in the time-forward direction comprises:
         comparing individual video frames sequentially, beginning with the individual video frame of the second video stream comprising timing information that is earliest in time and completing the comparing process with the individual video frame of the second video stream comprising timing information that is latest in time; and
      wherein the comparing in the time-reverse direction comprises:
         comparing individual video frames sequentially, beginning with the individual video frame of the second video stream comprising timing information that is latest in time and completing the comparing process with the individual video frame of the second video stream comprising timing information that is earliest in time; and
      wherein the video stream analysis module is further configured to calculate timing information corresponding to segment boundaries for the second video stream using the offset data.

15. The system of claim 14, wherein the characterizing metadata of the first and second video streams comprises average luminance values corresponding to video frames in the first and second video streams.

16. The system of claim 15, wherein the comparing of the characterizing metadata for the first video stream to the characterizing metadata for the second video stream comprises:
   calculating difference values between the average luminance values for each of the individual video frames of the second video stream and the average luminance values for each of the individual video frames of the first video stream;
   summing an absolute value of each of the difference values, for each of the individual video frames, to obtain a summed value; and
   when the summed value is lower than a threshold value, generating the offset data by subtracting timing information for the second video stream from timing information for the first video stream.

17. The system for processing video stream data of claim 16, wherein the video stream analysis module is further configured to associate the first timing information with the average luminance values for each of the plurality of video frames.

18. A method for processing video stream data, comprising:
   receiving, at a computer system having a processor, a first waveform depicting data comprising average luminance values for each of a plurality of video frames contained within a first video stream;
   calculating, at the computer system, average luminance values for each of a plurality of video frames contained within a second video stream;
   generating a second waveform, corresponding to the second video stream, using the calculated average luminance values;
   obtaining offset data by comparing the first waveform to the second waveform wherein the comparing progresses in using at least one of a time-forward direction and a time-reverse direction,
   wherein the comparing in the time-forward direction comprises:
      comparing individual video frames sequentially, beginning with the individual video frame of the second video stream comprising timing information that is earliest in time and completing the comparing process with the individual video frame of the second video stream comprising timing information that is latest in time; and
   wherein the comparing in the time-reverse direction comprises:
      comparing individual video frames sequentially, beginning with the individual video frame of the second video stream comprising timing information that is latest in time and completing the comparing process with the individual video frame of the second video stream comprising timing information that is earliest in time; and
   generating timing information regarding the beginning and ending of at least one portion of the video stream using the offset data.

19. The method of claim 18, wherein the comparing of the first waveform to the second waveform comprises:
   subtracting the average luminance values for each of the video frames of the second video stream from the average luminance values for each of the video frames of the first video stream to obtain a plurality of results;
   summing an absolute value of each of the plurality of results, for each of the video frames, to obtain a summed value;
   dividing the summed value by a total number of individual video frames for the second video stream to obtain a result; and
   when the result is lower than a threshold value, generating the offset data by subtracting timing information for the second video stream from timing information for the first video stream.

20. The method of claim 18, wherein the comparing of the first waveform to the second waveform further comprises:
   beginning the comparing at a video frame of the second video stream, wherein the individual video frame of the second video stream comprises timing information that is earlier in time than the timing information for the individual video frame of the first video stream which comprises the earliest timing information for the first video stream.

* * * * *